United States Patent
Dippel et al.

(10) Patent No.: US 9,383,918 B2
(45) Date of Patent: Jul. 5, 2016

(54) PORTABLE ELECTRONIC DEVICE AND METHOD OF CONTROLLING SAME

(75) Inventors: Jeffery John Paul Dippel, Waterloo (CA); Benjamin Biron, Gatineau (CA); Patrick-Andre Savard, Gatineau (CA); Mihal Lazaridis, Waterloo (CA); Donald James Lindsay, Mountain View, CA (US); Danny Thomas Dodge, Ottawa (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 13/243,749

(22) Filed: Sep. 23, 2011

(65) Prior Publication Data

US 2012/0098766 A1 Apr. 26, 2012

Related U.S. Application Data (60) Provisional application No. 61/386,219, filed on Sep. 24, 2010.

(51) Int. Cl.
*G06F 3/041* (2006.01)
*G06F 3/0488* (2013.01)

(52) U.S. Cl.
CPC .......... *G06F 3/04886* (2013.01); *G06F 3/0416* (2013.01); *G06F 3/04883* (2013.01); *G06F 2203/04808* (2013.01)

(58) Field of Classification Search
CPC .................................................. G06F 3/04886
USPC .................................................. 345/173–178
See application file for complete search history.

(56) References Cited

U.S. PATENT DOCUMENTS

| | | | |
|---|---|---|---|
| 5,177,328 | A | 1/1993 | Ito et al. |
| 5,579,036 | A | 11/1996 | Yates |
| 5,579,487 | A | 11/1996 | Meyerson et al. |
| 5,754,809 | A | 5/1998 | Gandre |
| 5,861,874 | A | 1/1999 | Joto |
| 6,088,024 | A | 7/2000 | Yamagata |
| 6,437,836 | B1 | 8/2002 | Huang et al. |
| 6,473,069 | B1 | 10/2002 | Gerpheide |

(Continued)

FOREIGN PATENT DOCUMENTS

| | | |
|---|---|---|
| CN | 1902599 A | 1/2007 |
| CN | 101432677 | 5/2009 |

(Continued)

OTHER PUBLICATIONS

Bragdon et al., "Experimental Analysis of Touch-Screen Gesture Designs in Mobile Environments," CHI 2011, May 7-12, 2011 (10 pages).

(Continued)

*Primary Examiner* — Jason Olson
(74) *Attorney, Agent, or Firm* — Fish & Richardson P.C.

(57) ABSTRACT

A method includes detecting a touch at a plurality of touch locations on a touch-sensitive display of an electronic device, identifying when the touch is a first gesture type based on touch attributes including a first touch location of the plurality of touch locations, and at least one of speed of the touch, time between detecting the touch at consecutive ones of the touch locations, distance between the consecutive ones of the touch locations, and direction of the touch.

16 Claims, 6 Drawing Sheets

(56) References Cited

U.S. PATENT DOCUMENTS

| | | | |
|---|---|---|---|
| 6,819,315 B2 | 11/2004 | Toepke et al. | |
| 6,833,827 B2 | 12/2004 | Lui et al. | |
| 7,656,393 B2 | 2/2010 | King et al. | |
| 8,184,108 B2 | 5/2012 | Smits | |
| 8,238,876 B2 | 8/2012 | Teng et al. | |
| 8,291,344 B2 | 10/2012 | Chaudhri | |
| 8,355,698 B2 | 1/2013 | Teng et al. | |
| 8,456,447 B2 | 6/2013 | Newton et al. | |
| 8,464,146 B2 | 6/2013 | Kang | |
| 8,477,082 B2 | 7/2013 | Lee et al. | |
| 8,533,844 B2 | 9/2013 | Mahaffey et al. | |
| 8,659,555 B2 | 2/2014 | Pihlaja | |
| 2001/0028365 A1 | 10/2001 | Ludolph | |
| 2002/0167489 A1 | 11/2002 | Davis | |
| 2002/0175836 A1 | 11/2002 | Roberts | |
| 2003/0156124 A1 | 8/2003 | Good et al. | |
| 2004/0260427 A1 | 12/2004 | Wimsatt | |
| 2005/0030291 A1 | 2/2005 | Yanagisawa | |
| 2005/0063149 A1 | 3/2005 | Shimamoto et al. | |
| 2005/0088421 A1 | 4/2005 | Toepke et al. | |
| 2005/0162406 A1 | 7/2005 | Ono et al. | |
| 2005/0289476 A1 | 12/2005 | Tokkonen | |
| 2006/0050061 A1 | 3/2006 | Aiken et al. | |
| 2006/0055685 A1 | 3/2006 | Rimas-Ribikauskas et al. | |
| 2006/0111182 A1 | 5/2006 | Nakanishi et al. | |
| 2006/0121985 A1 | 6/2006 | Nakanishi et al. | |
| 2006/0146055 A1 | 7/2006 | Chow et al. | |
| 2006/0238517 A1 | 10/2006 | King et al. | |
| 2007/0063987 A1 | 3/2007 | Sato et al. | |
| 2007/0174786 A1 | 7/2007 | Doi et al. | |
| 2007/0250787 A1 | 10/2007 | Kawahara et al. | |
| 2007/0262964 A1 | 11/2007 | Zotov et al. | |
| 2008/0001924 A1 | 1/2008 | de los Reyes et al. | |
| 2008/0007175 A1 | 1/2008 | Park | |
| 2008/0051642 A1 | 2/2008 | Krupnik | |
| 2008/0122796 A1 | 5/2008 | Jobs et al. | |
| 2008/0165141 A1* | 7/2008 | Christie | 345/173 |
| 2008/0222545 A1 | 9/2008 | Lemay et al. | |
| 2008/0238884 A1 | 10/2008 | Harish | |
| 2008/0273014 A1 | 11/2008 | Lowles et al. | |
| 2008/0284754 A1 | 11/2008 | Kao et al. | |
| 2009/0058820 A1 | 3/2009 | Hinckley et al. | |
| 2009/0061837 A1 | 3/2009 | Chaudhri et al. | |
| 2009/0085886 A1 | 4/2009 | Huang et al. | |
| 2009/0093315 A1 | 4/2009 | Matsunaga et al. | |
| 2009/0119678 A1 | 5/2009 | Shih et al. | |
| 2009/0135214 A1 | 5/2009 | Suzuki | |
| 2009/0146970 A1 | 6/2009 | Lowles et al. | |
| 2009/0174679 A1 | 7/2009 | Westerman | |
| 2009/0189868 A1 | 7/2009 | Joo et al. | |
| 2009/0189875 A1 | 7/2009 | Ma | |
| 2009/0237362 A1 | 9/2009 | Wu et al. | |
| 2009/0278795 A1 | 11/2009 | Hansen et al. | |
| 2009/0278806 A1 | 11/2009 | Duarte et al. | |
| 2010/0007675 A1 | 1/2010 | Kang et al. | |
| 2010/0020029 A1 | 1/2010 | Park et al. | |
| 2010/0058231 A1 | 3/2010 | Duarte et al. | |
| 2010/0073301 A1 | 3/2010 | Yousefpor et al. | |
| 2010/0088641 A1* | 4/2010 | Choi | 345/173 |
| 2010/0100067 A1 | 4/2010 | Pugliese, III | |
| 2010/0105443 A1* | 4/2010 | Vaisanen | 455/566 |
| 2010/0107067 A1 | 4/2010 | Vaisanen | |
| 2010/0110019 A1 | 5/2010 | Ozias et al. | |
| 2010/0134422 A1 | 6/2010 | Borras | |
| 2010/0137027 A1 | 6/2010 | Kim | |
| 2010/0145629 A1 | 6/2010 | Botich et al. | |
| 2010/0175018 A1 | 7/2010 | Petschnigg et al. | |
| 2010/0185989 A1 | 7/2010 | Shiplacoff et al. | |
| 2010/0194667 A1 | 8/2010 | Lee et al. | |
| 2010/0199190 A1 | 8/2010 | Cadiz et al. | |
| 2010/0207911 A1 | 8/2010 | Newton | |
| 2010/0211872 A1 | 8/2010 | Rolston et al. | |
| 2010/0214218 A1 | 8/2010 | Vaisanen et al. | |
| 2010/0229090 A1 | 9/2010 | Newton et al. | |
| 2010/0231539 A1 | 9/2010 | Cruz-Hernandez et al. | |
| 2010/0245242 A1 | 9/2010 | Wu et al. | |
| 2010/0245275 A1 | 9/2010 | Tanaka | |
| 2010/0246104 A1 | 9/2010 | Park et al. | |
| 2010/0269048 A1 | 10/2010 | Pahlavan et al. | |
| 2010/0302172 A1 | 12/2010 | Wilairat | |
| 2011/0004845 A1 | 1/2011 | Ciabarra | |
| 2011/0004888 A1 | 1/2011 | Srinivasan et al. | |
| 2011/0050607 A1* | 3/2011 | Park | 345/173 |
| 2011/0164065 A1 | 7/2011 | Mate et al. | |
| 2011/0167382 A1 | 7/2011 | van Os | |
| 2011/0205163 A1 | 8/2011 | Hinclkey et al. | |
| 2011/0208716 A1 | 8/2011 | Liu et al. | |
| 2011/0209099 A1 | 8/2011 | Hinckley et al. | |
| 2011/0298743 A1 | 12/2011 | Machida et al. | |
| 2011/0298746 A1 | 12/2011 | Hotelling | |
| 2012/0021777 A1 | 1/2012 | Lazaridis et al. | |
| 2012/0056818 A1 | 3/2012 | Shafi et al. | |
| 2012/0231881 A1 | 9/2012 | Matsunaga et al. | |
| 2013/0082978 A1 | 4/2013 | Horvitz et al. | |

FOREIGN PATENT DOCUMENTS

| | | |
|---|---|---|
| CN | 101527745 | 9/2009 |
| DE | 102006045591 | 5/2007 |
| EP | 2169521 A1 | 3/2010 |
| EP | 2175359 A2 | 4/2010 |
| EP | 2184671 | 5/2010 |
| EP | 2214085 | 8/2010 |
| KR | 10-2009-0017517 | 2/2009 |
| WO | 2006020304 A2 | 2/2006 |
| WO | WO 2007/133483 A1 | 11/2007 |
| WO | 2009/088672 | 7/2009 |
| WO | 2009/143075 | 11/2009 |
| WO | 2009/154862 A1 | 12/2009 |

OTHER PUBLICATIONS

Roth et al., "Bezel Swipe: Conflict-Free Scrolling and Multiple Selection on Mobile Touch Screen Devices," CHI 2009, Apr. 4-9, 2009 (4 pages).
Android 2.2 User Guide Manual, Google Inc., Aug. 2, 2010, whole document.
Samsung Vibrant, A Galaxy S Phone, Portable Quad-Band Mobile Phone User Manual, Samsung Telecommunications America LLC, 2010, whole document.
International Search Report dated Dec. 22, 2011, for International Application No. PCT/CA2011/050589, pp. 1-9.
International Search Report dated Dec. 16, 2011, for International Application No. PCT/CA2011/001069, pp. 1-8.
International Search Report dated Dec. 5, 2011, for International Application No. PCT/CA2011/050590, pp. 1-8.
International Search Report dated Dec. 21, 2011, for International Application No. PCT/CA2011/001070, pp. 1-24.
Roth V et al.: "Bezel Swipe: Conflict-Free Scrolling and Multiple Selection on Mobile Touch Screen Devices," CHI 2009—Digital Life, New World: Conference Proceedings and Extended Abstracts; The 27th Annual CHI Conference on Human Factors in Computing Systems, Boston, USA, ACM, Association for Ocmputing Machinery, New York, Apr. 4-9, 2009, pp. 1523-1526.
International Search Report dated Apr. 21, 2012, for International Application No. PCT/US2011/053061, pp. 1-7.
Written Opinion of International Searching Authority dated Apr. 21, 2012, for International Application No. PCT/US2011/053061, pp. 1-13.
Notice of Allowance dated Oct. 29 2014, issued in U.S. Appl. No. 13/243,677 (26 pages).
Office Action dated Sep. 26, 2014, issued in U.S. Appl. No. 13/240,250 (20 pages).
Japanese Office Action mailed Sep. 5, 2014, issued in Japanese Application No. 2013-510460 (3 pages).
Korean Office Action dated Sep. 11, 2014, issued in Korean Application No. 10-2012-7028450 (4 pages).
Extended European Search Report dated Oct. 15, 2014, issued in European Application No. 11182356.3 (7 pages).

(56) References Cited

OTHER PUBLICATIONS

Office Action dated Jan. 16, 2015, issued in U.S. Appl. No. 13/240,250 (9 pages).
Office Action dated Mar. 7, 2014, in corresponding U.S. Appl. No. 13/240,250, filed Sep. 22, 2011.
Office Action dated Mar. 6, 2014, in corresponding U.S. Appl. No. 13/243,677, filed Sep. 23, 2011.
Office Action issued in related CN Patent Application No. 201180021999.2 on Oct. 22, 2015; 3 pages.
Office Action issued in Canadian Application No. 2,811,253 on Nov. 24, 2015; 4 pages.
Office Action issued in DE Patent Application No. 112011101203.9 on Dec. 3, 2015; 5 pages.
Office Action issued in CN Patent Application No. 201180045776.X on Dec. 11, 2015; 7 pages.
Office Action for corresponding U.S. Appl. No. 13/243,613, dated Apr. 18, 2013.
Office Action for corresponding U.S. Appl. No. 13/243,613, dated Oct. 8, 2013.
Advisory Action for corresponding U.S. Appl. No. 13/243,613, dated Dec. 19, 2013.
Office Action for corresponding U.S. Appl. No. 13/243,613, dated Mar. 21, 2014.
Office Action for corresponding U.S. Appl. No. 13/243,613, dated Dec. 4, 2014.
Office Action for corresponding U.S. Appl. No. 13/240,230, dated Jul. 3, 2013.
Office Action for corresponding U.S. Appl. No. 13/240,230, dated Sep. 24, 2013.
Office Action for corresponding U.S. Appl. No. 13/240,230, dated Feb. 7, 2014.
Office Action dated Dec. 5, 2014, issued in U.S. Appl. No. 13/240,230 (21 pages).
Office Action dated Apr. 18, 2013, issued in U.S. Appl. No. 13/243,677.
Office Action dated Sep. 25, 2013, issued in U.S. Appl. No. 13/243,677.
Advisory Action dated Dec. 2, 2013, issued in U.S. Appl. No. 13/243,677.
Notice of Allowance dated Nov. 24, 2014, issued in U.S. Appl. No. 13/243,677.
Korean Office Action based on corresponding Korean Application No. 10-2012-7028450, dated Nov. 28, 2013.
Korean Office Action based on corresponding Korean Application No. 10-2012-7028523, dated Nov. 28, 2013.
Office Action issued in Chinese Patent Application No. 201180022020.3 dated Dec. 16, 2014; 9 pages.
Office Action issued in Chinese Patent Application No. 201180021999.2 dated Dec. 17, 2014; 13 pages.
Office Action issued in Chinese Application No. 201180045776.X on May 19, 2015; 8 pages.
Office Action issued in German Application No. 11 2011 101 206.3 on May 28, 2015; 5 pages.
Office Action issued in Canadian Application No. 2,812,288 on Jun. 10, 2015; 5 pages.
Office Action issued in Japanese Application No. 2013-510460 on Feb. 27, 2015; 3 pages.
Office Action issued in U.S. Appl. No. 13/243,613 on Mar. 26, 2015; 25 pages.
Office Action issued in respect of related U.S. Appl. No. 13/240,250 on Aug. 13, 2015; 32 pages.
Office Action issued in related CN Patent Application No. 201180022020.3 on Jul. 23, 2015; 5 pages.
Notice of Allowance issued in related U.S. Appl. No. 13/243,613 on Aug. 5, 2015; 20 pages.
Office Action issued in DE Patent Application No. 112011103202.1 on Dec. 17, 2015; 6 pages.
Office Action issued in CN Patent Application No. 201180022020.3 on Jan. 4, 2016; 6 pages.
Extended European Search report issued in EP Application No. 11182641.8 on Jan. 11, 2016; 12 pages.
Office Action issued in CN Patent Application No. 201180021869.9 on Jan. 25, 2016; 4 pages.
Extended European Search report issued in EP Application No. 11182584.0 on Jan. 15, 2016; 12 pages.
Office Action for corresponding Japanese Patent Application No. 2013-510460, dated Jan. 17, 2014.
Office Action for corresponding Japanese Patent Application No. 2013-510461, dated Jan. 17, 2014.
Office Action issued in Chinese Application No. 201180021869.9 on May 20, 2015; 14 pages.
Office Action issued in Chinese Application No. 201180021999.2 on Jun. 26, 2015; 3 pages.
Office Action dated Jun. 17, 2014, issued in U.S. Appl. No. 13/240,230 (21pages).
Canadian Office Action dated May 28, 2014, issued in Canadian Application No. 2,797,883 (3 pages).
Canadian Office Action dated May 21, 2014, issued in Canadian Application No. 2,797,877 (3 pages).
Canadian Office Action dated May 21, 2014, issued in Canadian Application No. 2,811,253 (2 pages).
Canadian Office Action dated May 27, 2014, issued in Canadian Application No. 2,812,288 (3 pages).
Korean Office Action dated Jun. 17, 2014, issued in Korean Application No. 10-2013-7010464 (5 pages).
Extended European Search Report issued in EP Application No. 11182349.8 on Feb. 11, 2016; 9 pages.
Office Action issued in DE Application No. 112011101209.8 on Feb. 23, 2016; 13 pages.
Crebolder et al.; "Visual Alerting in Complex Command and Control Environments"; Proceedings of the Human Factors and Ergonomics Society 53rd Annual Meeting—2009; 5 pages.
Office Action issued in U.S. Appl. No. 13/240,250 on Apr. 22, 2016; 10 pages.

\* cited by examiner

PORTABLE ELECTRONIC DEVICE AND METHOD OF CONTROLLING SAME

CROSS-REFERENCE TO RELATED APPLICATIONS

This application claims the benefit of U.S. Provisional Patent Application No. 61/386,219, filed Sep. 24, 2010, the entire content of which is incorporated herein by reference.

FIELD OF TECHNOLOGY

The present disclosure relates to electronic devices including, but not limited to, portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive display may be modified depending on the functions and operations being performed.

Improvements in electronic devices with touch-sensitive displays are desirable.

SUMMARY

According to one aspect, a method includes detecting a touch at a plurality of touch locations on a touch-sensitive display of a touch-sensitive display, identifying when the touch is a gesture that has an origin at a location on the electronic device that is non-touch-sensitive based on touch attributes including a first detected touch location of the plurality of touch locations, and at least one of speed of the touch, time between detecting the touch at consecutive ones of the touch locations, distance between the consecutive ones of the touch locations, and direction of the touch.

According to another aspect, an electronic device includes a touch-sensitive display, memory, and a processor coupled to the touch-sensitive display and the memory to carry out the above method.

BRIEF DESCRIPTION OF THE DRAWINGS

Embodiments of the present disclosure will now be described, by way of example only, with reference to the attached Figures, wherein.

DETAILED DESCRIPTION

The following describes an electronic device and a method that includes detecting a touch at a plurality of touch locations on a touch-sensitive display of an electronic device, identifying when the touch is a gesture that has an origin at a location on the electronic device that is non-touch-sensitive based on touch attributes including a first detected touch location of the plurality of touch locations, and at least one of speed of the touch, time between detecting the touch at consecutive ones of the touch locations, distance between the consecutive ones of the touch locations, and direction of the touch.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include wireless communication devices such as pagers, mobile or cellular phones, smartphones, wireless organizers, PDAs, notebook computers, netbook computers, tablet computers, and so forth. The portable electronic device may also be a portable electronic device without wireless communication capabilities. Examples include handheld electronic game devices, digital photograph albums, digital cameras, notebook computers, netbook computers, tablet computers, or other devices.

Figure 1:
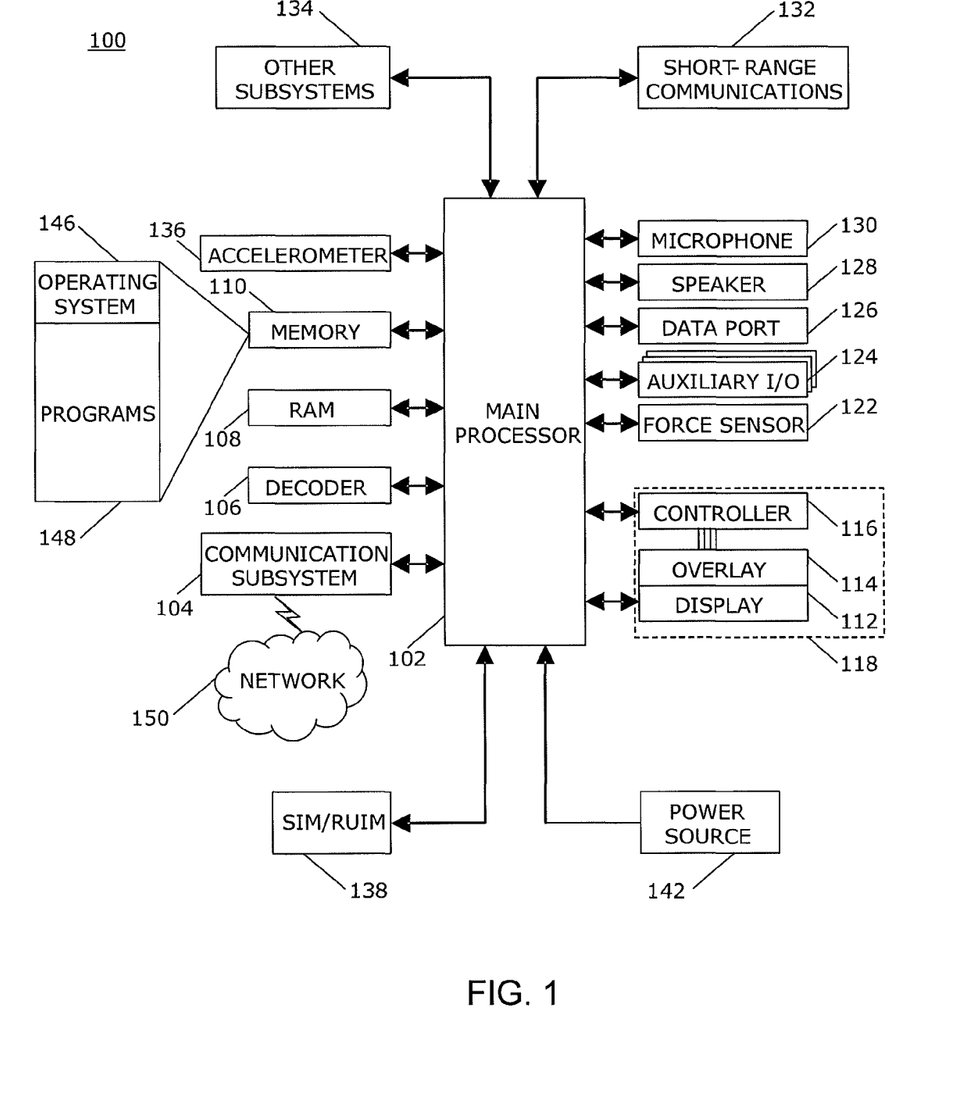
FIG. 1 is a block diagram of a portable electronic device in accordance with an example embodiment.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Accuracy of the determination of the touch location may be dependent on, for example, the pitch of the touch-sensitive display 118, which may be the distance between nodes, also referred to as touch sensors, of the touch-sensitive display 118 at which touches may be detected. The nodes or touch sensors are points at which electrodes of one touch sensor layer cross over electrodes of another touch-sensor layer.

Touch location data may include an area of contact or a single point of contact, such as a point at or near a center of the area of contact, known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches, are detected.

When a touch begins or is first detected, the touch is reported to the processor 102 by the controller 116. Signals may be provided to the controller 116 at regular intervals in time for a touch, also known as sampling, such that changes in location of the touch may be detected. The rate of sampling, referred to as the sampling rate, may be expressed in Hz, for example. When a touch moves to a new location, the new location may be reported to the processor 102. Very small movement or movements that do not exceed a threshold distance may not be reported by the controller 116 to the processor 102 to reduce reports of spurious movement or jitter.

One or more gestures are also detected by the touch-sensitive display 118. A gesture is a particular type of touch on a touch-sensitive display 118 that begins at an origin point and continues to an end point. A gesture may be identified by attributes of the gesture, including the first detected touch location, the end point, the location of the touch between the first detected touch location, and the end point, the time between touch reports from the controller 116 to the processor 102, the distance between touch reports, the total distance traveled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 114 to initialize the gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the gesture, a horizontal movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation gestures may also be detected by the touch-sensitive overlay 114. A meta-navigation gesture is a particular example of a gesture that has an origin point that is outside the display area of the touch-sensitive overlay 114 and that moves to a position on the display area of the touch-sensitive display 118. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 114. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 122 or force sensors are disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
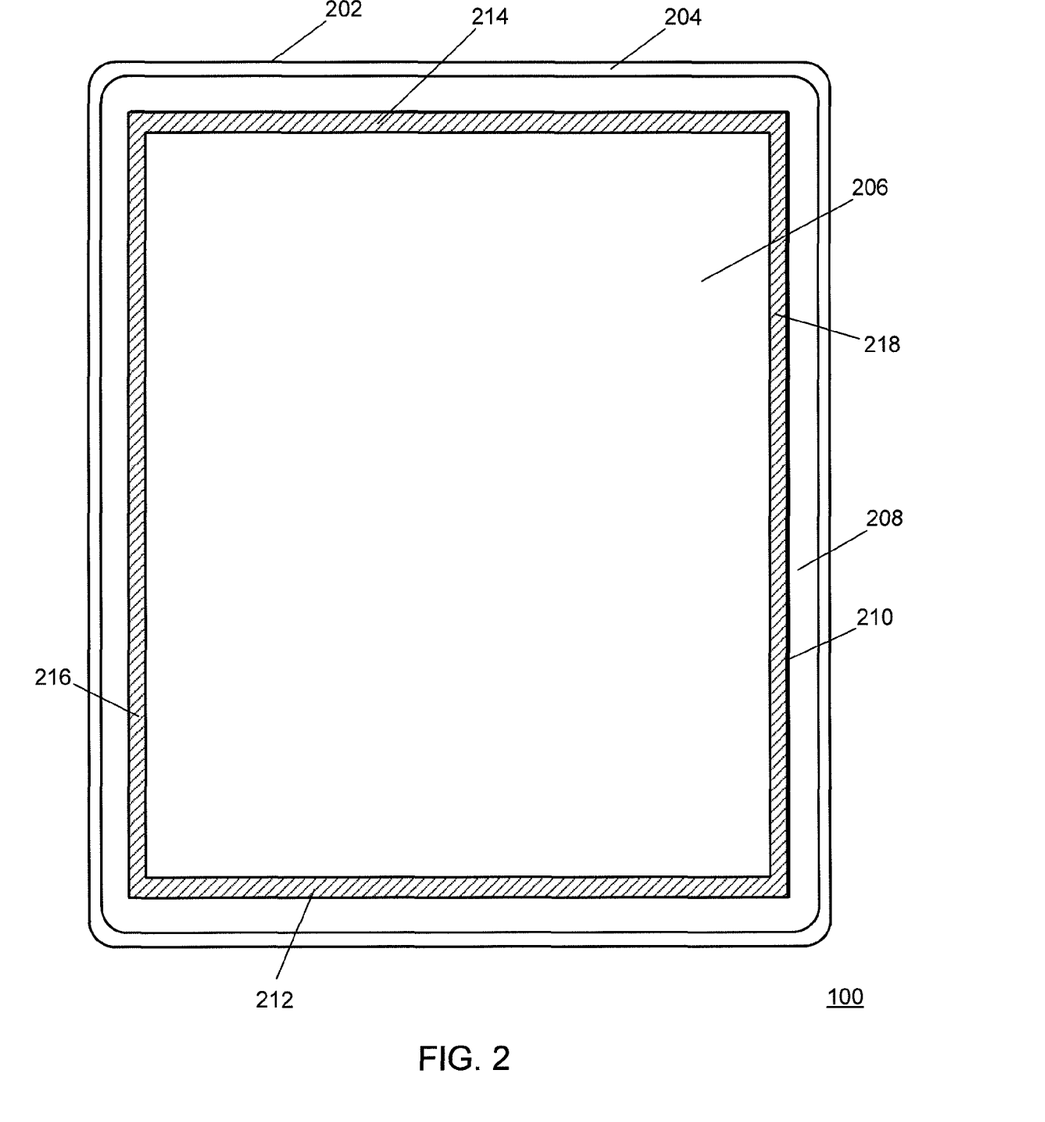
FIG. 2 is a front view of an example of a portable electronic device.

A front view of an example of the portable electronic device 100 is shown in FIG. 2. The portable electronic device 100 includes a housing 202 that encloses components such as shown in FIG. 1. The housing 202 may include a back, sidewalls, and a front 204 that frames the touch-sensitive display 118.

In the example of FIG. 2, the touch-sensitive display 118 is generally centered in the housing 202 such that a display area 206 of the touch-sensitive overlay 114 is generally centered with respect to the front 204 of the housing 202. The non-display area 208 of the touch-sensitive overlay 114 extends around the display area 206. The display area 206 ends at the edge 210 that extends around the display area 206.

For the purpose of the present example, the touch-sensitive overlay 114 extends to the edge 210, to cover the display area 206. The touch-sensitive overlay 114 does not cover the non-display area 208, however. Touches on the display area 206 may be detected and touches may be associated with displayed selectable features. Gestures that have origin points that are not on the touch-sensitive overlay 114, or not on the non-display area 208, and that move onto the touch-sensitive overlay 114, may also be identified. Such gestures are detected on the display area 206 and may be identified or determined by the attributes of the touch. Based on the attributes of the touch, the gestures may be identified or assumed to begin on the non-display area 208 or a bezel of the portable electronic device 100.

Gestures received on the touch-sensitive display 118 may be analyzed based on the attributes to discriminate between gestures that begin at locations that are not touch-sensitive and other touches. Touches may be identified as gestures that have an origin determined or identified as being off the touch-sensitive area of the touch-sensitive display 118 or at a location that is non-touch-sensitive, based on the attributes of each touch. Such gestures may be identified when the first detected location of the gesture is near a periphery of the touch-sensitive overlay 114, or near the edge 210. Such gestures may also be detected or identified based on distance between touch locations reported to the processor 102 for a touch and/or based on time between reports of touch locations for a touch.

A border region, also referred to herein as a region, may be utilized to identify gestures that begin outside the touch-sensitive area of the touch-sensitive display 118. The region extends from an edge of the touch-sensitive overlay 114 or the touch-sensitive area of the touch-sensitive display 118. In the examples described herein, the touch-sensitive area of the touch-sensitive display 118 is equal to the display area 206. For the purpose of explanation, the region is illustrated by the shaded area in FIG. 2. The region may or may not be visible to the user. The region has a width that may vary depending on the edge of the touch-sensitive overlay 114 that the region extends inwardly from. The region 212, which has a width referred to herein as Bxl, extends adjacent to the bottom edge of the display area 206. The region 214, which has a width referred to herein as Bxh, extends adjacent to the top edge of the display area 206. The region 216, which has a width referred to herein as Byl, extends adjacent to the left edge of the display area 206. The region 218, which has a width referred to herein as Byh, extends adjacent to the right edge of the display area 206. The terms up, down, left, right, top, and bottom are utilized herein for the purpose of providing a reference and refer to an area of the portable electronic device 100 relative to the orientation in which the information is displayed.

The width of each region may be dependent on, for example, the sampling rate of the touch-sensitive display 118, the pitch of the touch-sensitive display 118, and the maximum speed of a gesture. The higher the sampling rate, referred to herein as $f_s$, the closer the consecutively detected touch locations when a gesture is performed. The smaller the pitch, P, the greater the accuracy of determination of a touch location or the lower the error in determination of the touch location. The maximum speed of a gesture, Vmax, may be dependent on the user and may be determined experimentally. The width, B, of the regions 212, 214, 216, 218 may be determined utilizing each of these factors, for example by:

$$B = V\text{max}/(f_s P)$$

The width of the region is inversely proportional to the sampling rate, $f_s$. Thus, a smaller width may be utilized for an electronic device with a higher sampling rate. The regions 212, 214, 216, 218 may differ in width because of differences in the maximum speed, Vmax, of a gesture due to varying ergonomics as a result of starting location and direction of the gesture.

The first detected touch location may vary for gestures of the same velocity along the same path, due to differences in synchronicity or differences in the timing of the touch relative to sampling timing of the touch-sensitive display 118.

A gesture that has an origin at a location that is outside the touch-sensitive area of the touch-sensitive display 118 may be detected when a touch is first detected at a location, $x_1, y_1$, that is within one of the regions 212, 214, 216, 218, of width referred to as $B_{xl}, B_{xh}, B_{yl}, B_{yh}$, respectively, and the direction of the touch is generally inward from the region. For the touch-sensitive overlay 114 of resolution Rx×Ry, a gesture that has an origin that is outside the touch-sensitive area of the touch-sensitive display 118 may be detected when:

$$X_1 \leq B_{x1} \text{ or } X_1 \geq (R_x - B_{xl}) \text{ or } y_1 \leq B_{yl} \text{ or } y_1 \geq (R_y - B_{yl})$$

and a subsequently detected location, $X_n, Y_n$, is in the area of the touch-sensitive display 118, between the regions or inward of the regions such that $$X_n > B_{x1} \text{ or } X_n < (R_x - B_{x1}) \text{ or } y_n > B_{yl} \text{ or } y_n < (R_y - B_{yl}).$$

When, for example, $x_1 \leq B_{xl}$, the gesture originates at the left region 216, the direction is generally left to right, a meta-navigation gesture may be detected.
For a gesture that begins in a corner, $$[x_1 < B_{xl} \text{ or } x_1 \geq (R_x - B_{xl})] \text{ and } [y_1 \leq B_{yl} \text{ or } y_1 \geq (R_y - B_{yl})].$$

Reliability of identification of gestures as having origins that are outside the touch-sensitive area of the touch-sensitive display 118, may be dependent on one or more factors such as non-linearity of touch sensors or touch sensing near the edges of the touch-sensitive display 118, the size of the area of the touch, the angle of the finger touching the touch-sensitive display 118, the speed of the gesture, and the first detected touch location of the gesture. The width of the region may be adjusted, for example, by increasing the width to reduce occurrence of gestures that have an origin outside the touch-sensitive area of the touch-sensitive display 118 but are not detected as such.

To reduce the occurrence of detection of gestures that have origins in the touch-sensitive area of the touch-sensitive display 118 being identified as gestures that have origins outside the touch-sensitive area, a threshold distance value may be utilized and compared to the distance between detected touch locations of the swipe. When the distance between consecutive reported touch locations for a touch does not meet the threshold distance value, the touch is not identified as a gesture having an origin outside the touch-sensitive area of the touch-sensitive display 118. When the distance between consecutive reported touch locations for a touch meets the threshold distance value, the touch may be identified as a gesture having an origin outside the touch-sensitive area of the touch-sensitive display 118, which may be a meta-navigation gesture. A distance may meet a threshold value when the distance is equal to or greater than the threshold value. The threshold distance value may be utilized to reduce the effects of jitter.

Detected touch locations may be filtered to reduce the effect of jitter. For example, coordinates of a touch location for which a resulting direction from a first detected touch location, results in a complementary angle to an expected direction for the touch location, may be ignored, discarded, or not utilized. For example, for a first detected touch location that is within the boundary on the left and thus, $x_1 \leq B_{xl}$, a subsequent detected location that results in a negative change in the x coordinate to a location at which $x_n \leq x_1$, may be ignored to reduce the effects of jitter.

Figure 3A:
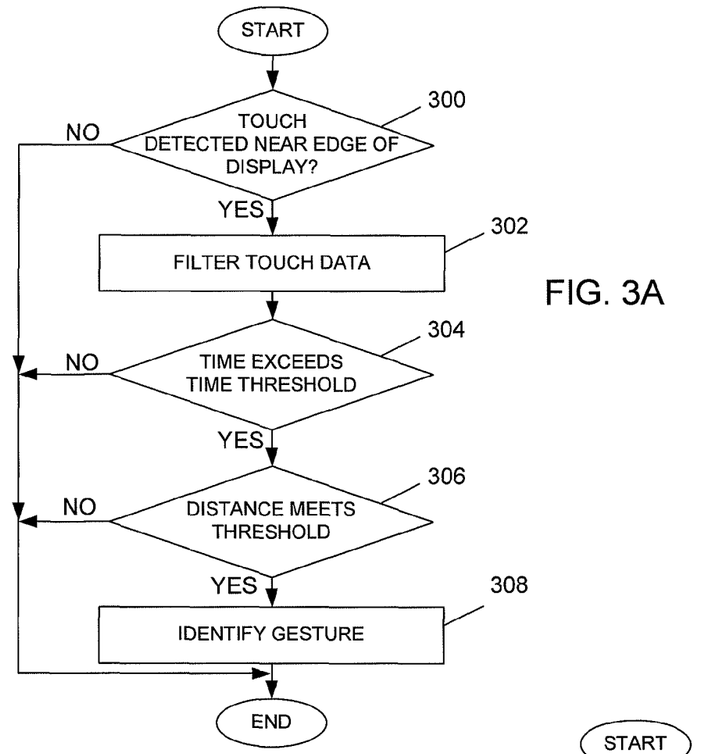
FIG. 3A and FIG. 3B are flowcharts illustrating a method of identifying meta-navigation gestures in accordance with an example embodiment.

A flowchart illustrating one example of a method of identifying a gesture as having an origin that is outside the touch-sensitive area of the touch-sensitive display 118, is shown in FIG. 3A. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

When a touch is detected and the first detected touch location is not near the edge 210 of the display area 206 or the touch-sensitive overlay 114 at 300, the touch is not identified as having an origin that is outside the touch-sensitive area of the touch-sensitive display 118 and the process ends. When a touch is first detected at a location near the edge 210 of the display area 206, the process continues at 302. Touches that are first detected at a location that is outside the regions 212, 214, 216, 218 near the periphery of the touch-sensitive overlay 114, or that are first detected at a distance from the edge that exceeds a threshold distance value, are not identified as having an origin that is outside the touch-sensitive area of the touch-sensitive display 118.

Touch data is filtered at 302 by discarding touch data of detected locations for which a resulting direction from a previously detected touch location, results in a complementary angle to an expected direction, or are in an opposing direction. An example of a method of filtering the touch data at 302 is described below with reference to FIG. 3B.

When the period of time between consecutive reported touch locations exceeds a threshold time value for a touch at 304, the touch is not identified as having an origin that is outside the touch-sensitive area of the touch-sensitive display 118. When the period of time between consecutive reported touch locations does not exceed a threshold value for a touch at 304, the process continues at 306. As indicated above, very small movements or when a touch that does not move by a threshold value, the location of the touch may not be reported again to the processor 102. Thus, for touches that do not move by a threshold distance, a longer period of time may pass between receipt of reported touch locations for the touch at the processor 102. When a period of time that exceeds a threshold value passes after a reported touch location and prior to receipt of a further report of a touch location for the touch, the touch is not moving, indicating a stationary touch or a beginning of a gesture and such touches are not identified as a gesture having an origin that is outside the touch-sensitive area of the touch-sensitive display 118.

When the distances between consecutive reported touch locations for a touch, do not meet a threshold distance value, the touch is not identified as having an origin that is outside the touch-sensitive area of the touch-sensitive display 118 and the process ends. When the distances between consecutive reported touch locations for a touch, meet a threshold distance value, the process continues at 308 and the touch is identified as having an origin that is outside the touch-sensitive area of the touch-sensitive display 118, such as a meta-navigation gesture, at 308. Thus, the distance between consecutive touch locations reported to the processor 102 for a touch, is utilized in this example to identify gestures having an origin that is outside the touch-sensitive area of the touch-sensitive display 118. A distance may meet a threshold value when the distance is equal to or greater than the threshold value.

Typically, gestures accelerate from an origin point when the gesture begins. Thus, gestures may be slower when they first begin than part way through the gesture or near the end of the gesture, for example. Consecutive reported touch locations that are close together may indicate that a gesture is starting, beginning at the first reported touch location, rather than a gesture that started off of the touch-sensitive overlay 114 and has already reached a gesture speed. A touch, for which consecutive reported touch locations are close together, or are not spaced apart by a threshold distance, is therefore not identified as a gesture having an origin that is outside the touch-sensitive area of the touch-sensitive display 118. Furthermore, the use of a threshold distance reduces the effects of jitter as described above.

Figure 3B:
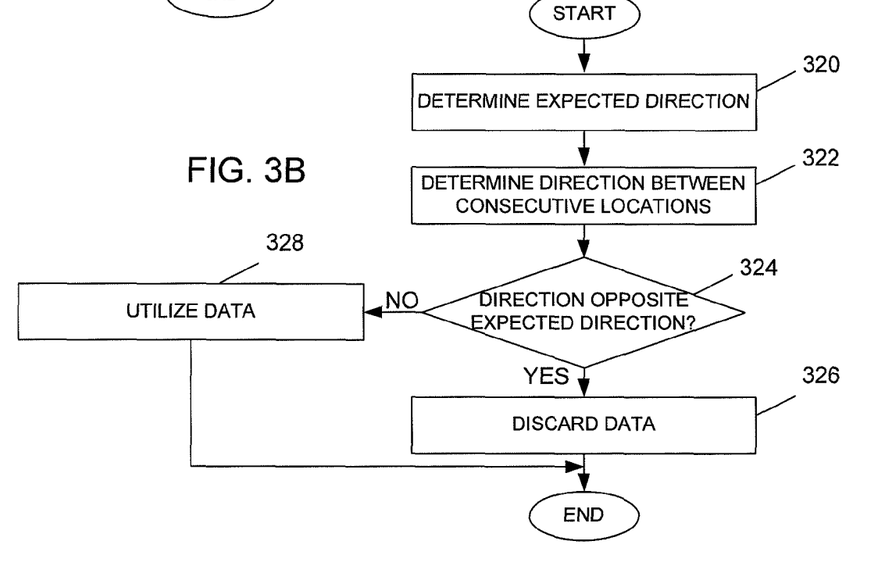

A flowchart illustrating one example of a method of filtering data at 302 of FIG. 3A, is shown in FIG. 3B. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

An expected direction is determined based on the first detected touch location at 320. The expected direction is the direction in which a gesture is expected to travel based on the first detected touch location for a gesture that begins at a location outside the touch-sensitive area of the touch-sensitive display. This direction differs based on the first detected touch location. For example, a gesture that is first detected at a location on the left side of the touch-sensitive display 118, is expected to travel in the left to right direction. A gesture that is first detected at a location on the right side of the touch-sensitive display 118, is expected to travel in the right to left direction. A gesture that is first detected at a location on near the top of the touch-sensitive display 118, is expected to travel in the downward direction. A gesture that is first detected at a location near a bottom of the touch-sensitive display 118, is expected to travel in an upward direction.

The direction between consecutive detected touch locations is determined for pairs of consecutively detected locations at 322. When the direction between consecutively detected touch locations is generally opposite to the expected direction at 324, or results in a complementary angle, within an acceptable error limit, the touch data for the later detected touch location of the pair, is discarded at 326. Thus, detected touch locations that result in an opposite direct on of travel to that expected for a gesture that begins at a location outside the touch-sensitive area of the touch-sensitive display 118, are not utilized. When the direction between consecutively detected touch locations is equal to the expected direction, within an acceptable error limit at 324, the touch data for the later detected touch location of the pair, is not discarded at 328.

Figure 4:
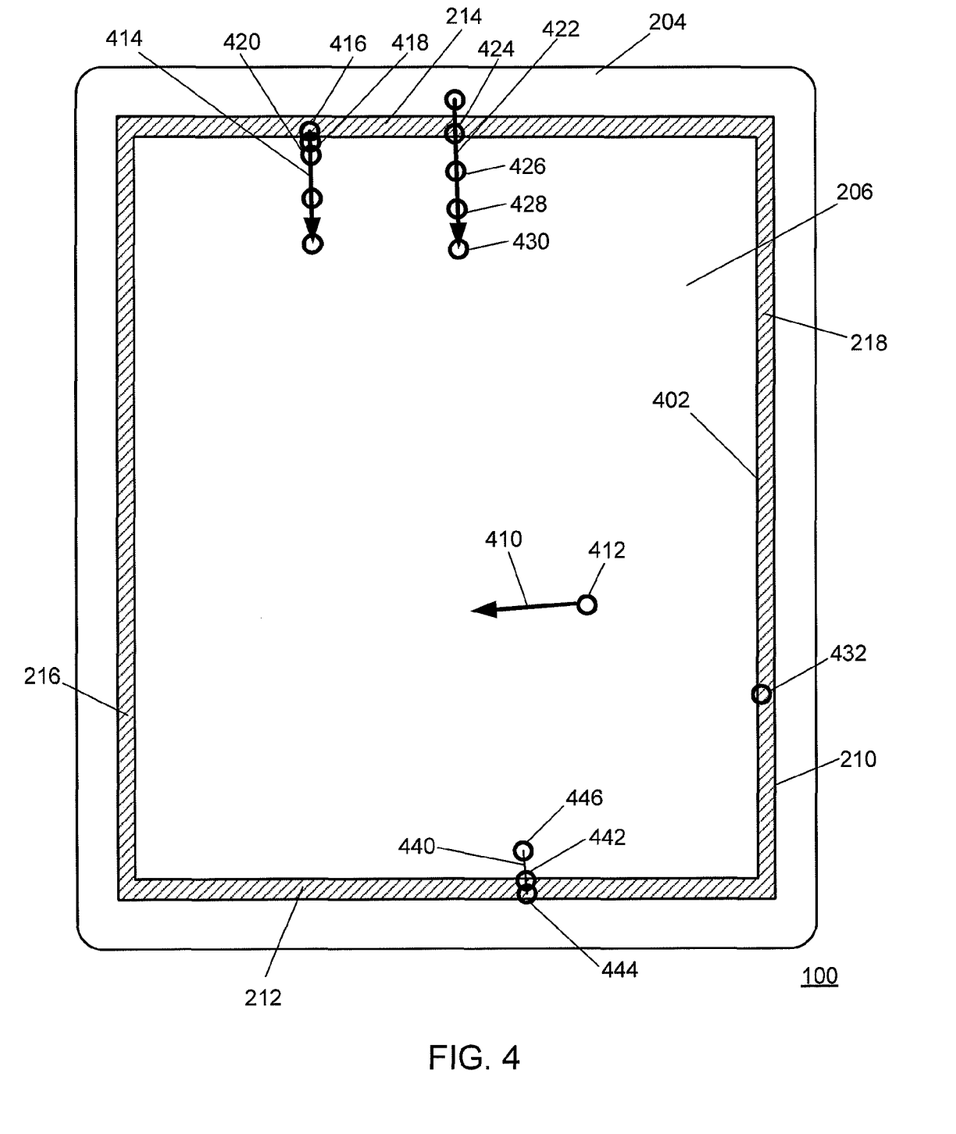
FIG. 4 illustrates examples of touches on the portable electronic device of FIG. 2.

FIG. 4 illustrates examples of touches on the touch-sensitive display 118. A threshold distance from the edge 210 is illustrated by the line 402 in FIG. 4. Touches that do not begin in a region 212, 214, 216, 218 between the edge 210 and the line 402, are not identified as gestures having an origin that is outside the touch-sensitive area of the touch-sensitive display 118. For the purpose of explanation, touches are illustrated by circles at their detected touch locations. Arrows extending through the circles illustrate the paths of the touches that are gestures.

The touch 410 is first detected at a location 412 that has a distance from the edge 210 that exceeds the threshold distance value, or that is outside the regions 212, 214, 216, 218 as determined at 300. The touch 410 is therefore not determined to be or identified as a gesture having an origin that is outside the touch-sensitive area of the touch-sensitive display 118.

The touch 414 is first detected at a location 416 that is determined at 300 to be a distance from the edge 210 that is within the threshold distance value. The directions of consecutive detected touch locations are generally in the expected direction and the touch data for each of the detected locations is utilized, as determined at 328. The times between consecutive reported touch locations 416, 418, 420 do not exceed the threshold time value at 304. The distances between the consecutive reported touch locations 416, 418, 420, however, do not meet the distance threshold, as determined at 306, and the touch is not identified as a gesture having an origin that is outside the touch-sensitive area of the touch-sensitive display 118.

The touch 422 is first detected at a location 424 that is determined at 300 to be a distance from the edge 210 that is within the threshold distance value. The directions of consecutive detected touch locations are generally in the expected direction and the touch data for each of the detected locations is utilized, as determined at 328. The times between consecutive reported touch locations 424, 426, 428, 430 for the touch, do not exceed the threshold time value, as determined at 304. The distances between the consecutive reported touch locations 424, 426, 428, 430 for the touch, meet the threshold distance value, as determined at 306, and the touch is identified as a gesture having an origin that is outside the touch-sensitive area of the touch-sensitive display 118 at 308.

The touch 432 is first detected at a location that is determined at 300 to be a distance from the edge 210 that is within the threshold distance value. The time between consecutive reported touch locations exceeds the threshold time value as determined at 304. The touch is not identified as a gesture having an origin that is outside the touch-sensitive area of the touch-sensitive display 118.

A touch 440 is first detected at a location 442 that is determined at 300 to be a distance from the edge 210 that is within the threshold distance value. A second detected touch location 444 and a third detected touch location 446 are illustrated. The expected direction for a gesture that is first detected at the location 442 is determined at 320. The direction from the first detected location 442 to the second detected touch location 444 is determined at 322 and is opposite to an expected direction for a gesture that begins at a location outside the touch-sensitive area of the touch-sensitive display 118, as determined at 324. The second detected touch location 444 is ignored, or discarded at 326 because the direction from the first detected touch location 442 to the second detected touch location 444 and the expected direction are generally opposite or together result in a complementary angle. The detected touch locations 442 and 446 are utilized at 304 through 308 to identify the gesture.

Although not described in the flowchart of FIG. 3A, gestures that have origins that are outside the touch-sensitive area of the touch-sensitive display 118 may optionally be identified based on direction of travel of each gesture such that gestures that travel in a direction that is not inward from near the edge 210, are not identified as gestures having an origin that is outside the touch-sensitive area of the touch-sensitive display 118.

Figure 5:
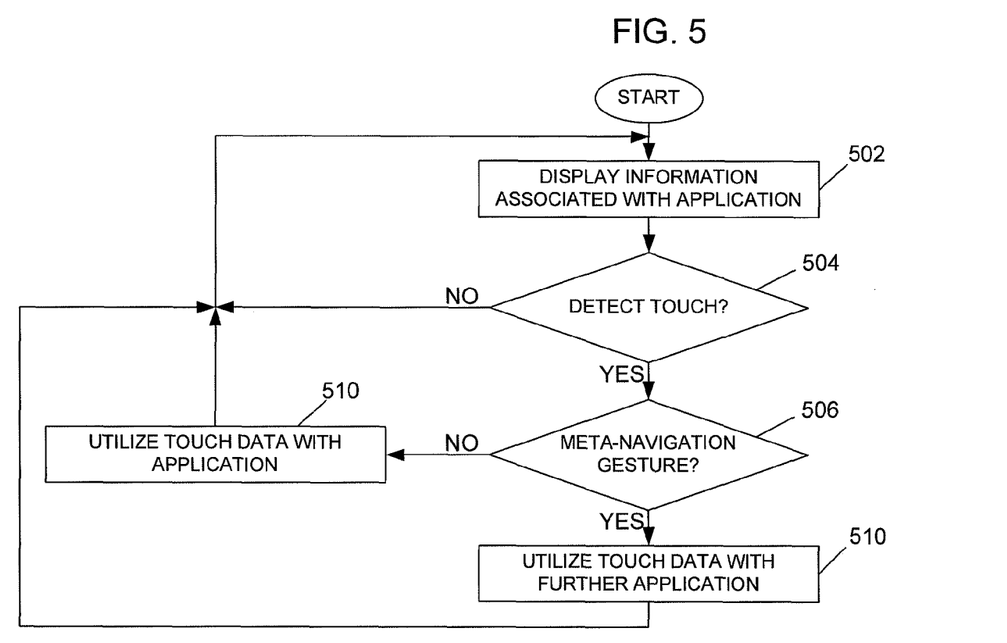
FIG. 5 is a flowchart illustrating a method of controlling the portable electronic device in accordance with an example embodiment.

A flowchart illustrating a method of controlling an electronic device, such as the portable electronic device 100, is shown in FIG. 5. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

The process may be carried out in any suitable application, such as, a home screen application, an email application, a text messaging application, a calendar application, a tasks application, an address book application, a web browser application, or any other suitable application. Information from the application, referred to as the first application, is displayed on the touch-sensitive display 118 of the portable electronic device 100 at 502. When a touch is detected at 504, the process continues at 506 and a determination is made whether or not the touch is a meta-navigation gesture. The determination is made based on the attributes of the touch as described above and may be made utilizing, for example, the method described with reference to FIG. 3. In response to determining that the touch is not a meta-navigation gesture, which may be a tap on the touch-sensitive display 118 or may be a non-meta-navigation gesture, the touch data is utilized in association with the first application for which information is displayed on the touch-sensitive display 118 at the time the gesture is received, at 508. In response to identifying the touch as a meta-navigation gesture at 506, the touch data is utilized in a second application and information associated with the second, or with a further application, is displayed on the touch-sensitive display 118 at 510. The information associated with the second application may be overlaid on the information associated with the first application, for example, to facilitate navigation back to the information associated with the first application. Alternatively, the information associated with the second application may include, for example, information from a system level navigation interface, a configuration interface, a notification interface, a status interface, a menu interface, or information associated with any other interface.

Figure 6:
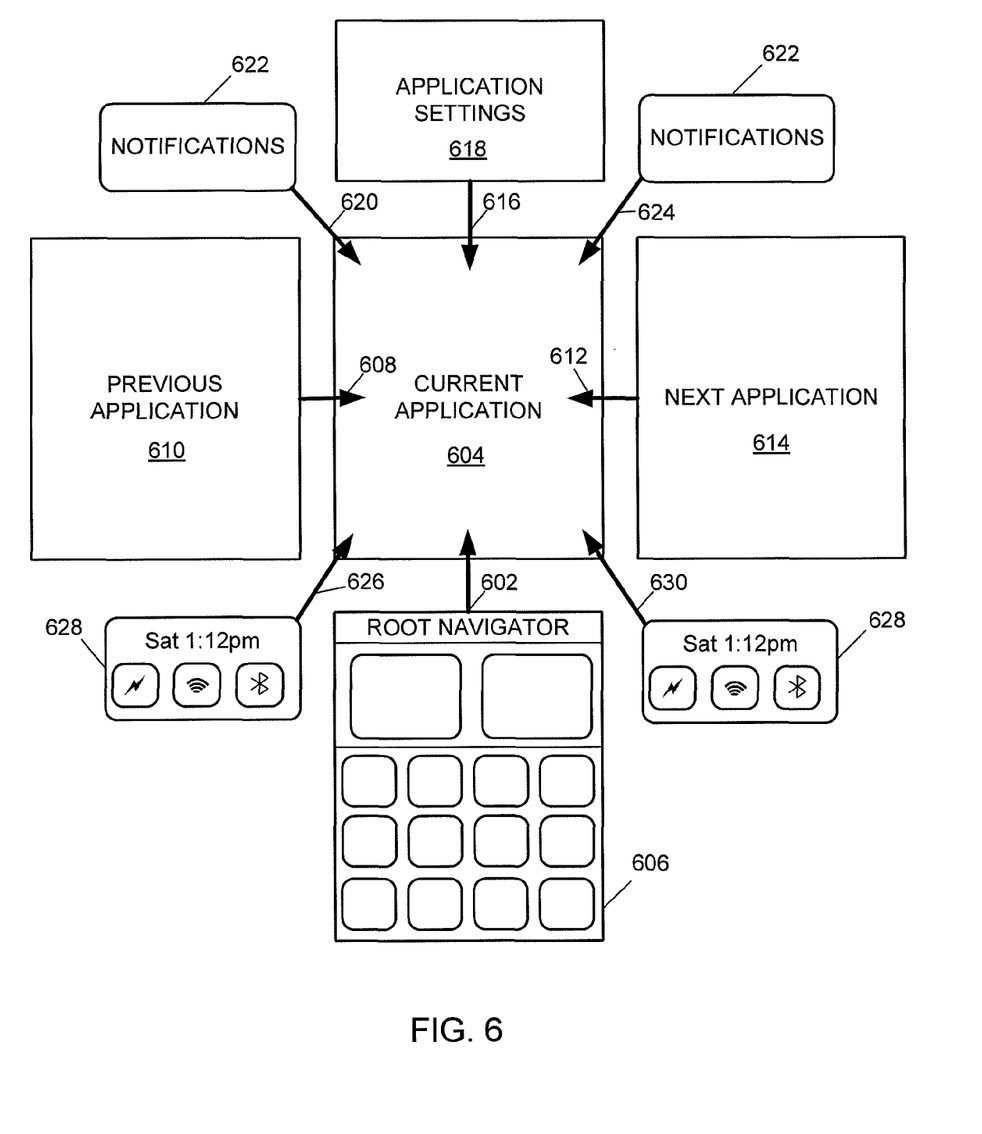
FIG. 6 illustrates examples of associations between meta-navigation gestures and information from applications.

Referring again to FIG. 4, the touch 422 identified as a gesture having an origin that is outside the touch-sensitive area of the touch-sensitive display 118, may be a meta-navigation gesture that is associated with information from an application such that attributes of the meta-navigation gesture such as the first detected touch location or the direction of travel, may be utilized to determine which application the meta-navigation gesture is associated with. FIG. 6 illustrates examples of associations between meta-navigation gestures and information from applications, other than the application associated with the information displayed on the touch-sensitive display 118 at the time the gesture is received. The relationships shown in FIG. 6 are shown for illustrative purposes only and are interchangeable. Further applications and alternative associations may be utilized.

The meta-navigation gesture 602 that is first detected near a bottom, center of the touch-sensitive display 118 and follows a generally vertical path in the orientation in which the information from a current application 604 is displayed, causes a homescreen associated with a root-navigation application 606 to replace the information associated with the current application 604. The homescreen may include a carousel showing the currently active applications indicated in a top portion of the display. Accordingly, currently active apps are shown in a browsable carousel in the top portion of the Home Screen. The carousel is located at a top portion of the homescreen. In the present example, the top portion utilizes only about one third of the home screen, and application icons for non-active applications are provided at the bottom portion of the home screen for ease of selection.

The meta-navigation gesture 608, which originates near a left, center of the touch-sensitive display 118 and follows a generally lateral path, causes the information associated with the current application 604 to be replaced with information associated with a previous application 610, which may be a previous application in a grouping or may be an application associated with information previously displayed. The meta-navigation gesture 612 that originates near a right, center of the touch-sensitive display 118 and follows a generally lateral path, causes the information associated with the current application 604 to be replaced with information associated with a next application 614, which may be a next application in a grouping.

The lateral gesture from either the left side or the right side of the touch-sensitive display 118 may cause the information associated with the current application 604 to be reduced in size to provide a visual cue of other active applications prior to replacing the information with the previous application 610 or the next application 614. For example, a portion of the information of the previous application 610 may be displayed in a thin sliver adjacent the edge or edges of the display area 206 during the gesture and prior to replacement of the information associated with the current application 604. The information associated with the current application 604 may be replaced with the previous application 610 or next application 614 as the gesture continues. In an alternative example, a portion of the information of the previous application 610 or a portion of the information for the next application 614 may be displayed in a thin sliver adjacent the edges of the display area 206 in response to a receipt of a first lateral gesture. In this example, a swipe within the thin sliver may cause scrolling of the next and last applications in a list. A second lateral meta-navigation gesture such as the gestures 608, 612 may be utilized to cause the information associated with the current application 604, which information is reduced in size, to be replaced.

The meta-navigation gesture 616, which originates near a top, center of the touch-sensitive display 118 and follows a generally vertical path, causes the information associated with the current application 604 to be replaced with information associated with an applications settings application 618.

The meta-navigation gesture 620 that originates near a top, left corner of the touch-sensitive display 118, causes information associated with a notification application 622 to be tiled over the information associated with the current application 604. Similarly, the meta-navigation gesture 624 that originates near a top, right corner of the touch-sensitive display 118, causes information associated with the notification application 622 to be tiled over the information associated with the current application 604.

The meta-navigation gesture 626 that originates near a bottom, left corner of the touch-sensitive display 118, causes information associated with a status application 628 to be tiled over the information associated with the current application 604. Similarly, the meta-navigation gesture 630 that originates near a bottom, right corner of the touch-sensitive display 118, causes information associated with the status application 628 to be tiled over the information associated with the current application 604.

Thus, gestures having an origin that is outside the touch-sensitive area of the touch-sensitive display 118, such as meta-navigation gestures, may be identified utilizing electronic devices with touch-sensitive displays that include a touch-sensitive overlay 114 that does not cover the non-display area 208 of the display 112.

The electronic device shown and described with reference to FIG. 2 and FIG. 4 is intended to illustrate one example of a suitable electronic device and the present disclosure is not limited to the illustrated example. Other suitable portable electronic devices may be utilized to carry out the processes described above.

The use of gestures having an origin that is outside the touch-sensitive area of the touch-sensitive display 118 and the identification of such gestures provide additional input that may be distinguished from gestures or other touches that have an origin on the touch-sensitive area of the touch-sensitive display 118. Meta-navigation gestures, for example, facilitate entry of input related to an application for which information is not displayed at the time the gesture is received. Thus, input may be received relating to an application that is not associated with information displayed on the touch-sensitive display without the use of icons or selectable features displayed on the touch-sensitive display and without the need to use other controls on the electronic device such as physical buttons or switches. An area or areas of the touch-sensitive display are not taken up to display such icons or selectable features. System level navigation is therefore provided without the use of additional screens or menus for such navigation, providing an improved interface.

According to one aspect, a method includes displaying information associated with a first application on a touch-sensitive display of an electronic device, detecting a touch at a plurality of touch locations on the touch-sensitive display, identifying when the touch is a gesture that has an origin at a location on the electronic device that is non-touch-sensitive based on touch attributes including a first touch location of the plurality of touch locations, and at least one of speed of the touch, time between detecting the touch at consecutive ones of the touch locations, distance between the consecutive ones of the touch locations, and direction of the touch.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a touch at a plurality of touch locations, including a first touch location, a second touch location, and a third touch location on a touch-sensitive display of an electronic device, wherein the first touch location, the second touch location, and the third touch location comprise consecutively reported touch locations, and wherein the first touch location is near an edge of the touch-sensitive display;
   identifying an expected direction dependent on the first touch location and the edge of the touch-sensitive display that is near the first touch location;
   determining a touch direction from the first touch location to the second touch location and filtering touch data based on the touch direction by comparing the touch direction to an expected direction and when the touch direction does not match the expected direction within an acceptable error limit, discarding the second touch location and utilizing the third touch location as a next touch location to identify when the touch is a first gesture type that has an origin at a location on the electronic device that is non-touch-sensitive, and when the touch direction matches the expected direction, within the acceptable error limit, utilizing the second touch location as the next touch location to identify when the touch is a first gesture type;
   identifying, based on the filtered touch data including the first touch location and the next touch location, when the touch is the first gesture by:
   in response to determining that a time between the first touch location and the next touch location exceeds a threshold time, determining that the touch is not the first gesture type; and
   in response to determining that a distance between the first touch location and the next touch location fans to meet a threshold distance, determining that the touch is not the first gesture type; and
   in response to determining that the time between the first touch location and the next touch location does not exceed the threshold time and that the distance between the first touch location and the next touch location meets the threshold distance, identifying the touch as the first gesture type that has an origin at a location on the electronic device that is non-touch-sensitive.

2. The method according to claim 1, comprising displaying information associated with a first application on the touch-sensitive display and wherein when the touch is identified as the first gesture type, the method comprises forwarding information related to the touch to a second application, otherwise forwarding the information related to the touch to the first application.

3. The method according to claim 1, wherein the first gesture type comprises a meta-navigation gesture.

4. The method according to claim 1, wherein the first touch location is near the edge when the first touch location is within a threshold distance of the edge of the touch-sensitive display.

5. The method according to claim 1, wherein a speed of the touch meets a threshold speed when the touch is identified as the first gesture type.

6. The method according to claim 1, comprising determining the touch direction based on the consecutively reported touch locations and wherein the touch direction is utilized to identify the touch as a meta-navigation gesture.

7. The method according to claim 1, comprising displaying information associated with a first application on the touch-sensitive display prior to identifying the first gesture type and displaying information associated with the second application on the touch-sensitive display when the touch is identified as the first gesture type.

8. The method according to claim 7, wherein displaying information associated with the second application comprises discontinuing displaying the information associated with the first application.

9. The method according to claim 7, wherein displaying information associated with the second application comprises overlaying the information associated with the first application.

10. The method according to claim 7, wherein displaying information comprises displaying information from one of a system level navigation interface, a configuration interface, a notification interface, a status interface, and an interface associated with a further application.

11. The method according to claim 1, wherein detecting a touch comprises detecting multiple touches that overlap in time on the touch-sensitive display and detecting the touch at the plurality of touch locations comprises detecting consecutive touch locations for each of the multiple touches.

12. The method according to claim 11, wherein identifying comprises determining that the multiple touches are the first gesture type based on the touch attributes of at least one of the multiple touches.

13. The method according to claim 1, wherein filtering comprises discarding touch data for the second touch location when the second touch location is in a direction, from the first touch location, that is generally opposite the expected direction.

14. The method according to claim 1, wherein filtering comprises discarding touch data for the second touch location when the second touch location is in a direction, from the first touch location, that is generally opposite a direction of the first gesture type.

15. A non-transitory computer-readable medium having computer-readable code executable by at least one processor of the portable electronic device to perform the method of claim 1.

16. An electronic device comprising:
a touch-sensitive display;
memory; and
a processor coupled to the touch-sensitive display and the memory to carry out the method according to claim 1.

* * * * *